(No Model.)
F. BARNES.
PLUMB LEVEL FOR STAIR BUILDERS.
No. 454,701. Patented June 23, 1891.
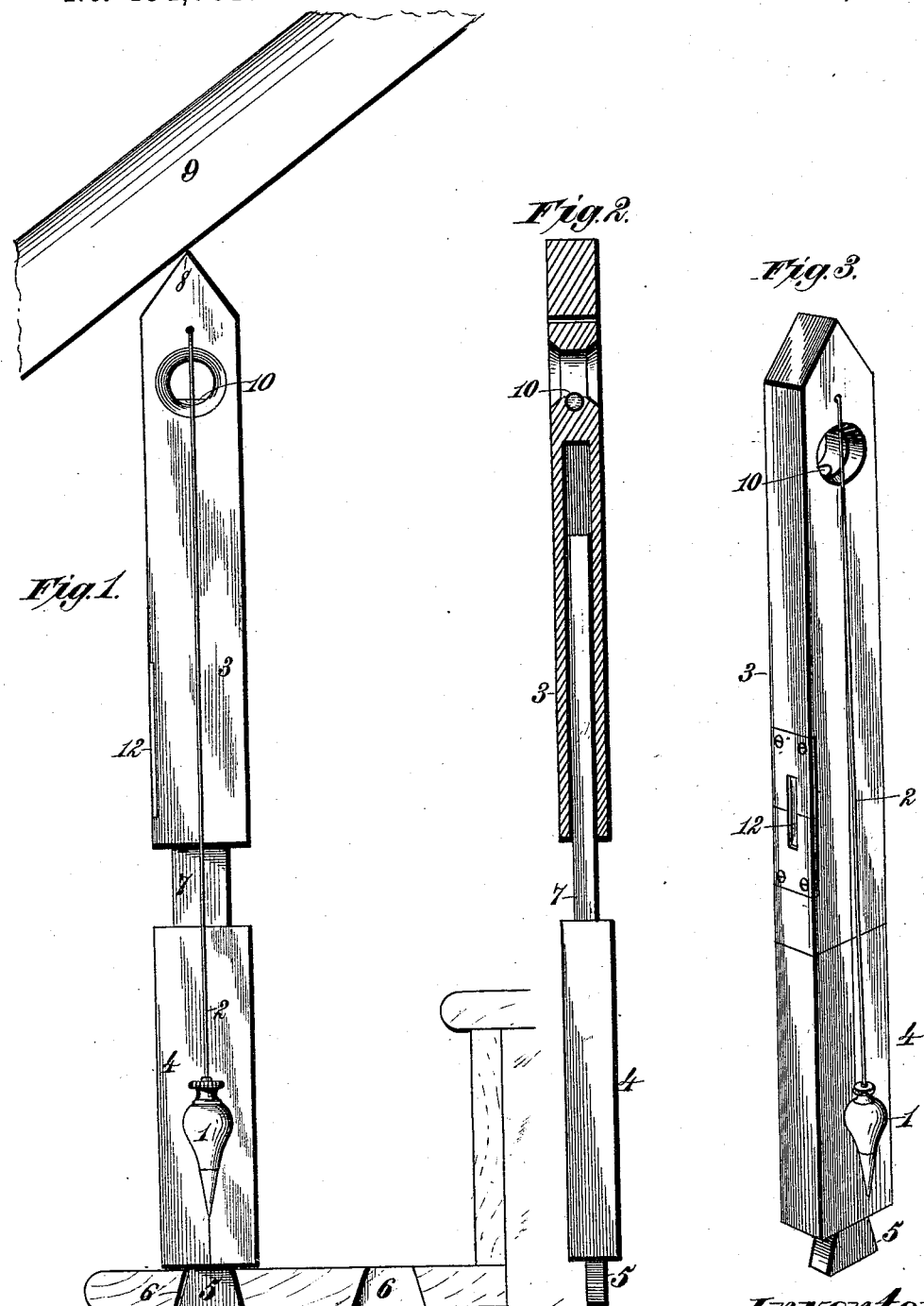
Witnesses,
Phil Emett
J. A. Rutherford
Inventor.
Francis Barnes.
By James L. Norris.
Atty.
THE NORRIS PETERS CO., PHOTO-LITHO., WASHINGTON, D. C.

United States Patent Office.

FRANCIS BARNES, OF WESTOVER, MARYLAND.

PLUMB-LEVEL FOR STAIR-BUILDERS.

SPECIFICATION forming part of Letters Patent No. 454,701, dated June 23, 1891.

Application filed May 3, 1890. Serial No. 350,510. (No model.)

*To all whom it may concern:*

Be it known that I, FRANCIS BARNES, a citizen of the United States, residing at Westover, in the county of Somerset and State of Maryland, have invented new and useful Improvements in Stair-Builders' Plumbs or Levels, of which the following is a specification.

This invention relates to a stair-builder's plumb or level, and has for its object to provide a simple instrument which can be adjusted to suit the pitch of the stairs and the height of the banisters, so that the mortises or recesses for the upper ends of the banister-rods can be accurately located in the under side of the hand-rail.

My invention consists in the construction and combination of parts hereinafter more fully described, and then definitely pointed out in the claims.

In the annexed drawings, illustrating the invention, Figure 1 shows a side elevation of my improved stair-builder's plumb, illustrating the manner of using the same. Fig. 2 is a central longitudinal section of the extensible plumb or level. Fig. 3 is a perspective view of my improved plumb-level.

Referring to the drawings, the numeral 1 designates a plumb-bob attached by a line 2, as usual, to the upper portion 3 of an extensible support comprising a lower portion or base 4, which is provided at its lower end with a lug or projection 5 to enter the usual mortise or recess formed in the end of the step to receive the tenon on the lower end of the banister-rod. This projection or lug 5 may be dovetailed, as shown, to fit a correspondingly-dovetailed mortise or recess 6 in the step, or said lug 5 may be of any other suitable form. One portion of the plumb-support, preferably its upper bar or section 3, as shown, is made hollow to receive an extension 7 of reduced dimensions on the other bar or section 4, thus forming a telescopic connection between said parts, whereby the length of the plumb-support can be varied to suit the pitch of the stairs. The upper portion or bar 3 is provided with a pointed upper end 8 to come in direct contact with the under side of the inclined hand-rail 9 and indicate by means of the plumb the precise point and angle in which the mortise or recess for the upper end of the banister-rod or column should be located, so that the banister-rods when set in position will be perpendicular. If desired, a spirit-level 10 may be located in either or both sides of one of the bars 3 or 4, preferably near the top of the upper bar, as shown, and, if preferred, this spirit-level can be employed instead of the plumb-line for obtaining the true vertical planes in which the mortises for the upper ends of the banisters should be located.

The manner of constructing and using the instrument will be obvious from the foregoing description in connection with the accompanying drawings; and it will be seen that my invention affords a convenient and accurate means for determining the proper location of the mortises for the upper ends of the banisters, so that they will correspond to the pitch of the stairs.

As clearly shown in Fig. 3, a spirit-level 12 may be located in one side of the plumb-support about midway its length. It is thus obvious that by means of the two spirit-levels 10 and 12, arranged as shown, the instrument may be used as a plumb or level either with or without the plumb-bob.

The pointed end 8 of the instrument when used as a stair-builder's plumb will serve as a straight-edge by which to mark on the under side of the hand-rail the proper position for the mortise to receive the upper end of the banister-rod.

What I claim as my invention is—

1. A stair-builder's plumb or level having an extensible support comprising an upper portion having an upper pointed end to come in contact with the under side of the banister hand-rail and a lower portion provided at its lower end with a lug to enter a mortise or recess in the end of a step, substantially as described.

2. In a stair-builder's plumb or level, the combination of vertically-extensible bars or sections, one of which has an upper pointed end to come in contact with the under side of the hand-rail and the other provided at its lower end with a lug to enter a mortise or recess in a step, substantially as described.

In testimony whereof I have affixed my signature in presence of two witnesses.

FRANCIS BARNES.

Witnesses:
W. B. SPIVA,
ROGER WOOLFORD.